3,177,340
FLUX-CORED ELECTRODE AND PROCESS OF
WELDING
François Georges Danhier, Uccle-Brussels, Belgium, assignor to La Soudure Electrique Autogene, S.A., Brussels, Belgium, a corporation of Belgium
No Drawing. Filed Nov. 16, 1962, Ser. No. 238,280
Claims priority, application Belgium, Nov. 24, 1961, 486,954
5 Claims. (Cl. 219—146)

The present invention relates to flux-cored electrodes for automatic or semi-automatic welding of iron and steel under gas protection and to processes of such welding. For convenience, iron will be included when steel is referred to throughout the specification and claims.

It has long been known that one can use in automatic visible arc welding, tubular electrodes having an external smooth metallic surface and containing internally protective slag-forming materials, ionizing ingredients, deoxidizers, denitriders and alloying additions, while protecting the molten pool against atmospheric air by a shielding gas such as argon, helium, carbon dioxide, carbon monoxide, or by a mixture of protective gases with other gases.

However, flux-cored electrodes which are commercially and technically satisfactory appeared relatively considerably later, when suitable formulations for the core mixture were developed.

One class of formulations, suitable for welding under protection of carbon dioxide or gas mixtures which are rich in carbon dioxide, and permitting the manufacture of electrodes which are easy to handle and produce good looking weld beads, with little spatter and deposting metal having satisfactory mechanical properties, is described in Belgian Patent No. 547,243, of April 28, 1956, and in United States Patent No. 2,591,231, of September 6, 1960.

Since 1956, all the flux-cored electrodes which are commercially used in steel welding produce during the welding operation a protective slag which has a high content of rutile, in the range of at least 40%. This slag also contains silica, manganese oxide and various other ingredients in smaller proportions.

The weld metal deposited under such a slag, even when it has correct amounts of medium-strong deoxidizers such as titanium and silicon and of weak deoxidizers such as manganese, exhibits only poor impact strength. The Charpy V impact strength at minus 10 degrees centigrade for multipass welds seldom exceeds 4 kgm./cm.². The Charpy V impact strength for single pass welds is much lower, especially when the thickness of the weld is greater.

Metal deposited under a slag of this character generally contains silicon in an amount greater than 0.25% and often also contains titanium, but in smaller proportions.

Sulphur and phosphorus which originate from the electrode and mainly from the base metal are present in appreciable quantities in the weld metal. The weld metal also includes certain microscopic inclusions of various oxides, silicates and titanates.

For these reasons the weld metal is apt to hot crack, particularly in root passes of narrow chamfers which are welded on restrained parts thicker than 25 millimeters.

Electrodes generating a sufficient amount of this rutile type slag give very good looking weld beads, with good wetting of the chamfer edges. In narrow chamfers the bulky solidified slag is very difficult to remove. This is a serious defect when the particular job requires multipass welding.

It has therefore appeared necessary for certain applications to design electrodes with less hot cracking sensitivity, depositing a more ductile metal and permitting easier multipass welding.

After extensive experimentation, several new types of electrodes have been developed, and are described hereafter.

The electrodes of the invention form substantial amounts of strongly basic slags, which optionally contain less silica, less titanium oxide and less aluminum oxide than basic oxides such as $K_2O$, $Na_2O$, BaO, CaO, MgO and which contain a substantial amount of fluoride, in particular fluorspar. These slags exert a very favorable metallurgical effect upon the weld metal, because they lower the sulphur content in the weld metal, and due chiefly to the action of the fluorides, they remove after deoxidation a portion of the residual silicon.

In order to introduce inside the envelope of such a tublular electrode a sufficient amount of material capable of forming such a slag, it is convenient to use a certain amount of a prefused product containing a portion of the fluorides and a major part of the calcium and magnesium oxides.

To obtain a basic slag producing welds of acceptable appearance, the fluidity of such a slag must be adjusted by proper additions of silica, titanium oxide and zirconium oxide.

For the fusion to be as quiet as possible, despite a high fluorine content, it is recommended that strong ionizers such as potassium, zirconium, titanium and magnesium be added.

The welds will show good impact strength provided their carbon content is held extremely low. The slag which I have developed contains a certain amount of iron oxide to burn off the undesirable carbon.

The electrode of the invention contains, in addition, deoxidizers such as silicon, and deoxidizer-denitriders, such as titanium, aluminum, magnesium, etc.

The denitriders are necessary because, despite the protection obtained from a covering of carbon dioxide gas, some atmospheric air often reaches close to the arc.

The strong deoxidizers such as aluminum and magnesium, provided they are present in small amounts, are entirely oxidized in the molten pool or at its surface. Medium strength deoxidizers such as silicon oxidize less rapidly and a fraction of such medium strength deoxidizers remains in the molten metal. The fluoride then removes a portion of them.

Weak deoxidizers, such as manganese, are eliminated only to a very small extent by the operation of deoxidation. The residual manganese remains in the weld metal as an alloying element.

Only by precise additions of several deoxidizers can one make sure that in all welding conditions the deposited metal will be well deoxidized and denitrided, with no excessive residual alloys and that the products of deoxidation will float rapidly upward to the surface of the metal to be eliminated in the slag.

A portion of the calcium and magnesium oxides which are important for the protection of the slag may be introduced in the form of granulated carbonates such as calcite, magnesia or dolomite. At the time the electrode melts, the carbonates generate carbon dioxide gas which contributes to the protection of the metal against the air. The amount of gas so generated at the tip of the electrode must, however, be moderate for fear the fusion will begin to sputter.

When the electrode must weld alloy steels, additions to the core of the electrode will be made in the form of powders of alloying metals or alloys, such as nickel, ferromolybdenum, ferrochrome, etc.

These considerations have led to the development of excellent basic flux-cored electrodes which comprise an external sheath or envelope of steel, which optionally can be low alloy steel, and a mixture of a certain number of non-metallic ingredients and of metallic powders in the core.

The iron of the electrode, therefore, comes mainly from the sheath. However, a portion of the iron may originate from the core where it exists in metallic form as iron powder, ferrosilicon, ferrotitanium, ferromanganese or other ferroalloys. In some cases, iron or other metals can be added in the form of a thin wire located inside the sheath.

The deoxidizers and denitriders are titanium, silicon or zirconium, which are present as metals, either unalloyed, or alloyed in the ferroalloys of the core or in the external sheath. The deoxidizers and denitriders are therefore not present in chemical compounds such as silica, titanates, silicates and oxides.

These deoxidizers are referred to as strong in contrast to manganese which is considered to be a weak deoxidizer.

The suitable compositions of basic electrodes as per the invention are contained within the limits shown in the formula below. Simple compounds mentioned in this formula may be present either as such in a prefused mixture, or in a natural silicate or in any other complex material. Where the percentages state a lower limit of zero or refer to up to a particular percentage, it will be evident that the particular ingredient may or may not be present, although if it is present it will be present in an effective quantity.

|  | Percent |
|---|---|
| ($a$) At least one fluoride of the class consisting of alkali metal fluorides, alkaline earth metal fluorides and cryolite, such as calcium fluoride, sodium fluoride, or cryolite, but preferably in the form of calcium fluoride. The reference to "at least one" indicates of course that more than one such fluoride may be used as desired | 5 to 9 |
| ($b$) At least one alkaline earth metal oxide such as lime, magnesia or barium oxide, but preferably calcium or magnesium oxide or both | 1 to 4 |
| ($c$) At least one alkaline earth metal carbonate, for example calcium, magnesium, strontium or barium carbonate, but preferably calcium carbonate | 0 to 2 |
| ($d$) Zirconium oxide | 0 to 3 |
| ($e$) Silica | 0 to 3.5 |
| ($f$) At least one oxide of potassium, sodium or lithium, preferably potassium oxide | 0 to 2 |
| ($g$) Titanium oxide | 0 to 4 |
| ($h$) At least one oxide or carbonate of iron, manganese, vanadium, molybdenum or chromium | 0 to 2 |
| ($i$) At least one deoxidizer of the class consisting of metallic aluminum and metallic magnesium | 0 to 1 |
| ($j$) At least one deoxidizer of the class consisting of metallic titanium and metallic silicon | 0 to 1 |
| ($k$) Metallic manganese | 0.5 to 3 |
| ($l$) Free carbon | 0 to 0.4 |
| ($m$) Alumina plus various other oxides | 0 to 2 |
| ($n$) Iron | 68 to 84 |

In this range of compositions, it is desirable to fulfill the following conditions:

(1) The sum of the ingredients $a$ plus $b$ plus $c$ plus $f$ must be greater than the sum of the ingredients $3e$ plus $d$ plus $g$ plus $m$.

(2) The sum of the ingredients $5$ ($i$ plus $j$) plus $k$ minus $h$ must be higher than 3%.

(3) The sum of the ingredients $i$ plus $j$ must be greater than 0.4%.

Similar electrodes may be used to weld alloy steels but in such cases the above formula must be modified to change the composition of the ingredient $n$ as follows:

|  | Percent |
|---|---|
| ($n$) The total of the iron plus manganese plus other alloying elements | 60 to 85 |

Alloying elements must be generally understood as including all the metals generally used in alloy steels, and in addition carbon and boron.

On the other hand, experience has shown that a large proportion of the alkali metal fluorides and alkaline earth metal fluorides could optionally be replaced by either alkali metal or alkaline earth metal fluosilicates. In this variation the weight $a$ of the fluorides must be replaced by a weight $a^1$ of fluorides plus a weight $a^2$ of fluosilicates as follows:

|  | Percent |
|---|---|
| $a^1$ fluorides such as calcium fluoride, sodium fluoride or cryolite | 1 to 4 |
| $a^2$ alkali metal or alkaline earth metal fluosilicates | 5 to 10 |

Such an electrode produces a weld bead which is covered after solidification with a vitreous slag shaped as a shell of substantial thickness.

Another type of electrode according to the present invention is intended to facilitate welding in narrow chamfers under a protective atmosphere of carbon dioxide. When using coated electrodes or flux-cored electrodes of previously known types for such welding, the amount of flux is generally such that after each weld pass in the joint, an elaborate removal of slag is necessary. If an electrode is used in which the flux proportion is relatively low, for instance between 8 and 11% of the total weight of the electrode, then the layer of slag covering the metal after each welding pass is thin and it becomes possible to weld several passes without removing the slag. In this case, however, during a major portion of the welding operation, the welding pool is no longer properly protected because the slag layer covering it is too thin to be non-permeable to the air and to the oxygen generated from the decomposition of the carbon dioxide atmosphere.

The invention contemplates an electrode which will generate a gas during welding which is less oxidizing than carbon dioxide and which dilutes the carbon dioxide, said electrode also containing alkali metal or alkaline earth metal fluoride which reduces the sulphur and the silicon content of the weld metal. This result is obtained by introducing in the core of the electrode a substantial amount of alkali metal or alkaline earth metal fluosilicate. The fluosilicates break down to form silicon tetrafluoride gas and alkali metal or alkaline earth metal fluoride. The fluorides react with other components of the electrode and produce fluorine containing gases.

Alkaline earth metal fluorides and a small amount of carbonates may be added to these fluosilicates. Certain metallic elements such as magnesium generate ionizing and reducing vapors which are favorable to the production of high quality weld metals.

Experience shows that weld beads deposited by this group of electrodes have a low content of silicon and of impurities and a good resistance to cracking and a good impact strength at low temperature.

Due to the small volume of slag required for these electrodes, the main portion of the core is made up of manganese and of active or strong deoxidizers, and the whole of the core is a rather dense powder amounting to only 8 to 11% of the total weight of the electrode.

This electrode distinctively contains at least one fluosilicate of potassium, sodium, barium, rubidium or cesium and at least one alkali metal or alkaline earth metal fluoride or cryolite, which total at least 0.6% of the weight of the electrode. Of course, several fluosilicates and several fluorides may be used if desired. This electrode also contains at least 0.5% by weight of active deoxidizers and at least 0.5% by weight of metallic manganese.

For various reasons, it is sometimes desirable to increase the bulk of the core by adding iron powder to it.

It is desirable in this type of electrode to use a composition ranging between the following limits by weight:

|  | Percent |
|---|---|
| (a) At least one fluoride of the class which consists of alkali metal fluorides and alkaline earth metal fluorides such as fluorspar and permissibly containing complex fluorides | 0 to 2 |
| (b) At least one fluosilicate of the class which consists of alkali metal fluosilicates and alkaline earth metal fluosilicates, preferably sodium fluosilicate | 0.2 to 3 |
| (c) The sum of the fluorides and fluosilicates should be at least | 0.6 |
| (d) Metal silicon | 0 to 0.75 |
| (e) Metallic zirconium | 0 to 0.5 |
| (f) Metallic titanium | 0 to 1.5 |
| (g) Metallic aluminum | 0 to 0.4 |
| (h) Metallic magnesium | 0 to 0.4 |
| (i) The sum of these active deoxidizers is at least | 0.5 |
| (j) Metallic manganese | 0.5 to 3.5 |
| (k) Other alloying elements | 0 to 16.5 |
| (l) Carbon of the class which consists of free carbon and carbon combined in organic form and graphite | 0 to 5 |
| (m) Alkaline earth metal carbonate | 0 to 1 |
| (n) Silica, metallic oxides, alumina and various other oxides | 0 to 0.9 |
| (o) Iron | Balance |

Such an electrode may be used to build up metallic parts suitably of steel. If this use is not to be employed, the other alloying elements may be eliminated and the maximum content of carbon will be limited to 1.4%.

In another variation of this type of electrode, from 0 to 3% of carbonate of iron or of manganese and from 0 to 3% of oxide of iron or of manganese, which may optionally be combined with other elements, is employed. In such an electrode the total percentage of silicon, zirconium, titanium, aluminum and magnesium should be greater than the total percentage of such carbonates and oxides present.

The present invention also relates to an automatic or semi-automatic upward welding of vertical joints between steel parts, in particular between vertical plates, by means of a visible electric arc operating in a gaseous protective atmosphere, while containing the molten metal of the weld pool by means of cooled copper shoes which are pressed against the lateral faces of the parts being welded. This process, sometimes called electrogas welding, is well known in the art. It is suitable for welding vertical plates of 10 to 60 millimeters' thickness in a single pass with square edges.

Up to the present time, such welding has been with solid wires because it was believed that the gas protection between the shoes was sufficient and because the use of tubular electrodes provided with a core of slag-forming materials, of the character used in welding under other conditions, would result in a continuous increase of the slag layer over the molten pool between the shoes, with the consequence that visibility of the arc would be lost unless frequent interruptions were permitted to remove the slag.

When using a solid wire, upward air drafts infiltrate between the plates and the shoes when the shoes are no longer perfectly pressed against the plates because of superficial defects of the plates. These updrafts then reach the surface of the molten pool and oxidize the fused metal. Furthermore, the absence of slag over the pool prevents elimination of certain impurities coming from the fusion of a portion of the base metal during welding. Such elimination is taking place when a slag of suitable composition is supplied to the pool by melting of the welding electrode.

The present invention relates to an electrogas process in which these drawbacks are eliminated.

In the process of the present invention, tubular electrodes are used which include a core consisting of slag-forming materials, at least one alkali metal or alkaline earth metal fluoride, at least one alkaline earth metal carbonate, titanium oxide and deoxidizers, the total weight of all of the non-ferrous ingredients of the core being between 3 and 5.5% of the total weight of the electrode.

As the plates being welded become thicker, the amount of slag originating from the electrode used in the process must decrease. In fact, once the slag has fulfilled its physical and metallurgical function, it must be eliminated in the form of a generally discontinuous layer passing between the shoes and the weld bead, so that it does not form a thick layer above the weld pool.

It is not, however, sufficient to make the process satisfactory for the proportion of slag formed from the electrode to be relatively small. The slag must also have special physical characteristics in order to spread uniformly upon the lateral surface of the weld bead without accumulating at the edges, where indentations would appear. Its metallurgical effect must allow it to remove certain impurities coming from the plates, notwithstanding the small volume of the slag. It must also absorb a portion of the excess of deoxidizers.

Speaking broadly, in order to weld under protection of carbon dioxide, the core of the electrode must contain large amounts of deoxidizers in addition to manganese and in addition to other alloying elements which are sometimes required. The quantity of manganese must be greater when the plates are thicker.

Since a greater portion of the slag is removed in welding thin plates, electrodes for welding thin plates are richer in slag in order to benefit as much as possible from the favorable metallurgical action of the slag.

Suitable compositions for flux-cored electrodes for electrogas welding of high quality under protection of carbon dioxide, of unalloyed and low alloyed steel plates of various thicknesses are given below in percentages by weight.

For welding low carbon steel plates up to 20 millimeters thick:

(a) At least one alkaline earth metal fluoride, preferably calcium fluoride—0.45 to 0.75%, preferably 0.63%.

(b) At least one alkaline earth metal carbonate, preferably calcium carbonate—0.12 to 0.28%, preferably 0.22%.

(c) At least one deoxidizer of the class consisting of metallic titanium and metallic silicon—0.60 to 0.90%, preferably 0.75%.

(d) Metallic manganese—2 to 2.5%, preferably 2.25%.

(e) At least one titanium compound of the class consisting of titanium oxides and titanates—0 to 0.08%, preferably 0.04%.

(f) Carbon in the form of carbon or graphite—0.01 to 0.15%, preferably 0.11%.

(g) At least one oxide of the class consisting of FeO, NiO and MnO—0.01% to 0.10%, preferably 0.04%.

(h) Miscellaneous—0 to 0.15%, preferably 0.12%.
(i) Iron—balance.

A portion of the fluorides, up to 50% by weight of the fluorides, may be replaced by alkali metal fluosilicates or alkaline earth metal fluosilicates.

For welding low alloy steel plates up to 20 millimeters thick:

(a) At least one alkaline earth metal fluoride, preferably calcium fluoride—0.45 to 0.75%, preferably 0.62%.
(b) At least one alkaline earth metal carbonate, preferably calcium carbonate—0.12 to 0.28%, preferably 0.23%.
(c) At least one titanium compound of the class consisting of titanium dioxide plus titanates—0 to 0.8%, preferably 0.03%.
(d) At least one oxide of the class consisting of FeO, NiO and MnO—0.01 to 0.10%, preferably 0.04%.
(e) At least one deoxidizer of the class consisting of metallic titanium and metallic silicon—0.65 to 0.95%, preferably 0.88%.
(f) Metallic manganese—2.75 to 3.25%, preferably 2.95%.
(g) Metallic nickel—0.50 to 1.20%, preferably 0.80%.
(h) Metallic chromium—0 to 0.2%, preferably 0.09%.
(i) Metallic molybdenum—0 to 0.2%, preferably 0.10%.
(j) Carbon of the class consisting of carbon or graphite—0.01 to 0.20%, preferably 0.14%.
(k) Miscellaneous—0 to 0.15%, preferably 0.12%.
(l) Iron—balance.

A portion of the fluorides, up to 50% by weight of the fluorides, may be replaced by a fluosilicate of the class consisting of alkali metal fluosilicates and alkaline earth metal fluosilicates.

For welding low carbon steel plates up to 35 millimeters thick:

(a) At least one alkaline earth metal fluoride, preferably calcium fluoride—0.22 to 0.30%, preferably 0.26%.
(b) At least one alkaline earth metal carbonate, preferably calcium carbonate—0.06 to 0.14%, preferably 0.10%.
(c) At least one deoxidizer of the class consisting of metallic titanium and metallic silicon—0.60 to 0.90%, preferably 0.75%.
(d) Metallic manganese—2.25 to 2.75%, preferably 2.48%.
(e) At least one titanium compound of the class consisting of titanium dioxide and titanates—0.08 to 0.22%, preferably 0.16%.
(f) At least one oxide of the class consisting of FeO, NiO and MnO—0.01 to 0.10%, preferably 0.06%.
(g) Potassium oxide—0 to 0.04%, preferably 0.02%.
(h) Miscellaneous—0 to 0.15%, preferably 0.12%.
(i) Carbon of the class consisting of carbon and graphite—0.01 to 0.15%, preferably 0.12%.
(j) Iron—balance.

A portion of the fluoride, up to 50% by weight of the fluoride, may be replaced by alkali metal fluosilicate or alkaline earth metal fluosilicate.

For welding low alloy steel plates up to 35 millimeters thick:

(a) At least one alkaline earth metal fluoride, preferably calcium fluoride—0.22 to 0.32%, preferably 0.29%.
(b) At least one alkaline earth metal carbonate, preferably calcium carbonate—0.06 to 0.14%, preferably 0.09%.
(c) At least one titanium compound of the class consisting of titanium oxide and titanates—0.01 to 0.10%, preferably 0.02%.
(d) Potassium oxide—0 to 0.04%, preferably 0%.
(e) At least one deoxidizer of the class consisting of metallic titanium and metallic silicon—0.60 to 0.90%, preferably 0.78%.
(f) Metallic manganese—2.75 to 3.25%, preferably 2.80%.
(g) Metallic molybdenum—0 to 0.3%, preferably 0.23%.
(h) Metallic nickel—0.50 to 1.10%, preferably 0.65%.
(i) Carbon—0.01 to 0.20%, preferably 0.14%.
(j) Miscellaneous—0 to 0.16%, preferably 0.14%.
(k) Iron—balance.

A portion of the fluoride, up to 50% by weight of the fluoride, may be replaced by an alkali metal fluosilicate or an alkaline earth metal fluosilicate.

For low carbon steel plates up to 60 millimeters thick:

(a) At least one alkaline earth metal fluoride, preferably calcium fluoride—0.18 to 0.26%, preferably 0.23%.
(b) At least one alkaline earth metal carbonate, preferably calcium carbonate—0.05 to 0.13%, preferably 0.09%.
(c) At least one deoxidizer of the class consisting of metallic titanium and metallic silicon—0.60 to 0.90%, preferably 0.75%.
(d) Metallic manganese—2.35 to 2.85%, preferably 2.60%.
(e) At least one titanium compound of the class consisting of titanium dioxide and titanates—0.07 to 0.18%, preferably 0.13%.
(f) An oxide of the class consisting of FeO, NiO and MnO—0.01 to 0.10%, preferably 0.05%.
(g) Potassium oxide—0 to 0.03%, preferably 0.01%.
(h) Carbon—0 to 0.15%, preferably 0.12%.
(i) Iron—balance.

A portion of the fluoride, up to 50% by weight of the fluoride, may be replaced by alkali metal fluosilicate or alkaline earth metal fluosilicate.

For welding low alloy steel plates up to 60 millimeters thick:

(a) At least one alkaline earth metal fluoride, preferably calcium fluoride—0.18 to 0.28%, preferably 0.24%.
(b) At least one alkaline earth metal carbonate, preferably calcium carbonate—0.05 to 0.13%, preferably 0.08%.
(c) At least one titanium compound of the class consisting of titanium dioxide plus titanates—0.01 to 0.10%, preferably 0.026%.
(d) Potassium oxide—0 to 0.04%, preferably 0%.
(e) A deoxidizer of the class consisting of metallic titanium and metallic silicon—0.60 to 0.90%, preferably 0.79%.
(f) Metallic manganese—2.75 to 3.25%, preferably 2.88%.
(g) Metallic nickel—0.70 to 1.30%, preferably 1.03%.
(h) Carbon—0.01 to 0.20%, preferably 0.14%.
(i) Miscellaneous—0 to 0.16%, preferably 0.14%.
(j) Iron—balance.

A portion of the fluoride, up to 50% by weight of the fluorides, may be replaced by an alkaline metal fluosilicate or an alkaline earth metal fluosilicate.

In view of my invention and disclosure, variations and modifications to meet individual whim or particular need will doubtless become evident to others skilled in the art, to obtain all or part of the benefits of my invention without copying the product shown, and I therefore claim all such insofar as they fall within the reasonable spirit and scope of my claims.

In view of my invention and disclosure, what I claim as new and desire to secure by Letters Patent is:

1. A flux-cored electrode for use in an automatic or semi-automatic upward welding process for joining vertical seams between steel parts, which process comprises maintaining a visible electric arc in a carbon dioxide protective atmosphere at the weld seam and thus producing molten metal in a weld pool, containing the molten metal in the weld pool by cooling copper shoes pressed against the lateral surfaces of the steel parts being welded, and supplying to the arc to continue to maintain it, a tubular electrode having a core provided with flux, which flux-cored electrode for welding low carbon steel plates up to 20 millimeters thick has the following composition by weight:

| | Percent |
|---|---|
| (a) At least one alkaline earth metal fluoride | 0.45 to 0.75 |
| (b) At least one alkaline earth metal carbonate | 0.12 to 0.28 |
| (c) At least one deoxidizer of the class consisting of titanium and silicon | 0.60 to 0.90 |
| (d) Metallic manganese | 2 to 2.50 |
| (e) At least one titanium compound of the class consisting of titanium oxides and titanates | Up to 0.08 |
| (f) Carbon of the class consisting of carbon and graphite | 0.01 to 0.15 |
| (g) At least one oxide of the class consisting of FeO, NiO and MnO | 0.01 to 0.10 |
| (h) Miscellaneous | Up to 0.15 |
| (i) Iron | Balance |

2. A flux-cored electrode for use in an automatic or semi-automatic upward welding process for joining vertical seams between steel parts, which process comprises maintaining a visible electric arc in a carbon dioxide protective atmosphere at the weld seam and thus producing molten metal in a weld pool, containing the molten metal in the weld pool by cooling copper shoes pressed against the lateral surfaces of the steel parts being welded, and supplying to the arc to continue to maintain it, a tubular electrode having a core provided with flux, which flux-cored electrode for welding low alloy steel plates up to 20 millimeters thick has the following composition by weight:

| | Percent |
|---|---|
| (a) At least one alkaline earth metal fluoride | 0.45 to 0.75 |
| (b) At least one alkaline earth metal carbonate | 0.12 to 0.28 |
| (c) At least one titanium compound of the class consisting of titanium dioxide and titanates | Up to 0.8 |
| (d) At least one oxide of the class consisting of FeO, NiO and MnO | 0.01 to 0.10 |
| (e) At least one deoxidizer of the class consisting of metallic titanium and metallic silicon | 0.65 to 0.95 |
| (f) Metallic manganese | 2.75 to 3.25 |
| (g) Metallic nickel | 0.50 to 1.20 |
| (h) Metallic chromium | Up to 0.2 |
| (i) Metallic molybdenum | Up to 0.2 |
| (j) Carbon of the class consisting of carbon and graphite | 0.01 to 0.20 |
| (k) Miscellaneous | Up to 0.15 |
| (l) Iron | Balance |

3. A flux-cored electrode for use in an automatic or semi-automatic upward welding process for joining vertical seams between steel parts, which process comprises maintaining a visible electric arc in a carbon dioxide protective atmosphere at the weld seam and thus producing molten metal in a weld pool, containing the molten metal in the weld pool by cooling copper shoes pressed against the lateral surfaces of the steel parts being welded, and supplying to the arc to continue to maintain it, a tubular electrode having a core provided with flux, which flux-cored electrode for welding low carbon steel plates up to 35 millimeters thick, has a composition by weight as follows:

| | Percent |
|---|---|
| (a) At least one alkaline earth metal fluoride | 0.22 to 0.30 |
| (b) At least one alkaline earth metal carbonate | 0.06 to 0.14 |
| (c) At least one deoxidizer of the class consisting of metallic titanium and metallic silicon | 0.60 to 0.90 |
| (d) Metallic manganese | 2.25 to 2.75 |
| (e) At least one titanium compound of the class consisting of titanium dioxide and titanates | 0.08 to 0.22 |
| (f) At least one oxide of the class consisting of FeO, NiO and MnO | 0.01 to 0.10 |
| (g) Potassium oxide | Up to 0.04 |
| (h) Miscellaneous | Up to 0.15 |
| (i) Carbon of the class consisting of carbon and graphite | 0.01 to 0.15 |
| (j) Iron | Balance |

4. A flux-cored electrode for use in an automatic or semi-automatic upward welding process for joining vertical seams between steel parts, which process comprises maintaining a visible electric arc in a carbon dioxide protective atmosphere at the weld seam and thus producing molten metal in a weld pool, containing the molten metal in the weld pool by cooling copper shoes pressed against the lateral surfaces of the steel parts being welded, and supplying to the arc to continue to maintain it, a tubular electrode having a core provided with flux, which flux-cored electrode for welding low alloy steel plates up to 35 millimeters thick, has the following composition by weight:

| | Percent |
|---|---|
| (a) At least one alkaline earth metal fluoride | 0.22 to 0.32 |
| (b) At least one alkaline earth metal carbonate | 0.06 to 0.14 |
| (c) At least one titanium compound of the class consisting of titanium dioxide and titanates | 0.01 to 0.10 |
| (d) Potassium oxide | Up to 0.04 |
| (e) At least one deoxidizer of the class consisting of metallic titanium and metallic silicon | 0.60 to 0.90 |
| (f) Metallic manganese | 2.75 to 3.25 |
| (g) Metallic molybdenum | Up to 0.3 |
| (h) Metallic nickel | 0.50 to 1.10 |
| (i) Carbon | 0.01 to 0.20 |
| (j) Miscellaneous | Up to 0.16 |
| (k) Iron | Balance |

5. A flux-cored electrode for use in an automatic or semi-automatic upward welding process for joining vertical seams between steel parts, which process comprises maintaining a visible electric arc in a carbon dioxide protective atmosphere at the weld seam and thus producing molten metal in a weld pool, containing the molten metal in the weld pool by cooling copper shoes pressed against the lateral surfaces of the steel parts being welded, and supplying to the arc to continue to maintain it, a tubular electrode having a core provided with flux, which flux-cored electrode for welding low alloy steel plates up to 60 millimeters thick, has the following composition by weight:

| | Percent |
|---|---|
| (a) At least one alkaline earth fluoride | 0.18 to 0.28 |
| (b) At least one alkaline earth carbonate | 0.05 to 0.13 |
| (c) At least one titanium compound of the class consisting of titanium dioxide and titanates | 0.01 to 0.10 |
| (d) Potassium oxide | Up to 0.04 |
| (e) At least one deoxidizer of the class consisting of metallic titanium and metallic silicon | 0.60 to 0.90 |
| (f) Metallic manganese | 2.75 to 3.25 |
| (g) Metallic nickel | 0.70 to 1.30 |
| (h) Carbon | 0.01 to 0.20 |
| (i) Miscellaneous | Up to 0.16 |
| (j) Iron | Balance |

References Cited by the Examiner

FOREIGN PATENTS 819,958 9/59 Great Britain.
842,204 7/60 Great Britain.

RICHARD M. WOOD, *Primary Examiner.*